June 13, 1933.  A. S. REYNOLDS  1,913,512
METEOROLOGICAL INDICATOR
Original Filed Oct. 10, 1925   3 Sheets-Sheet 2
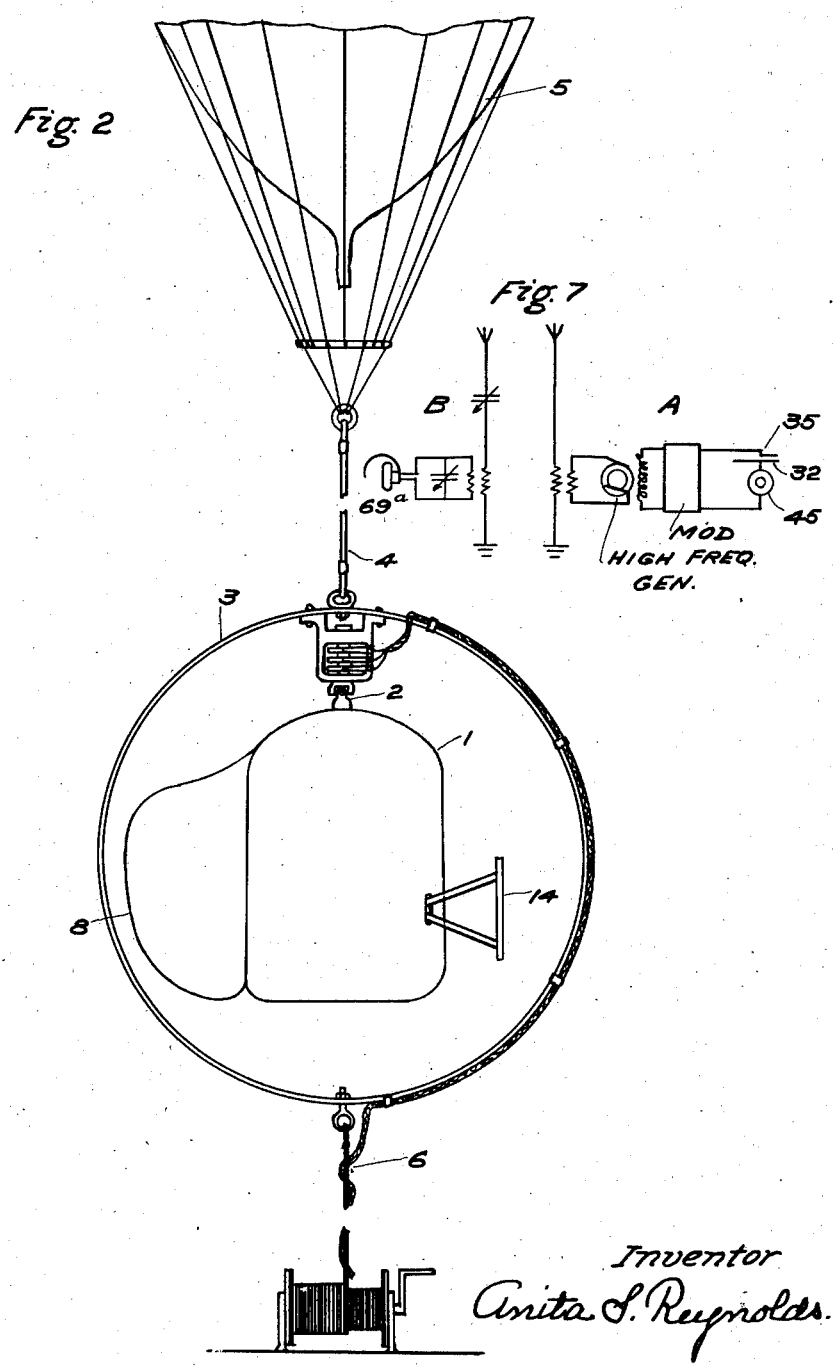

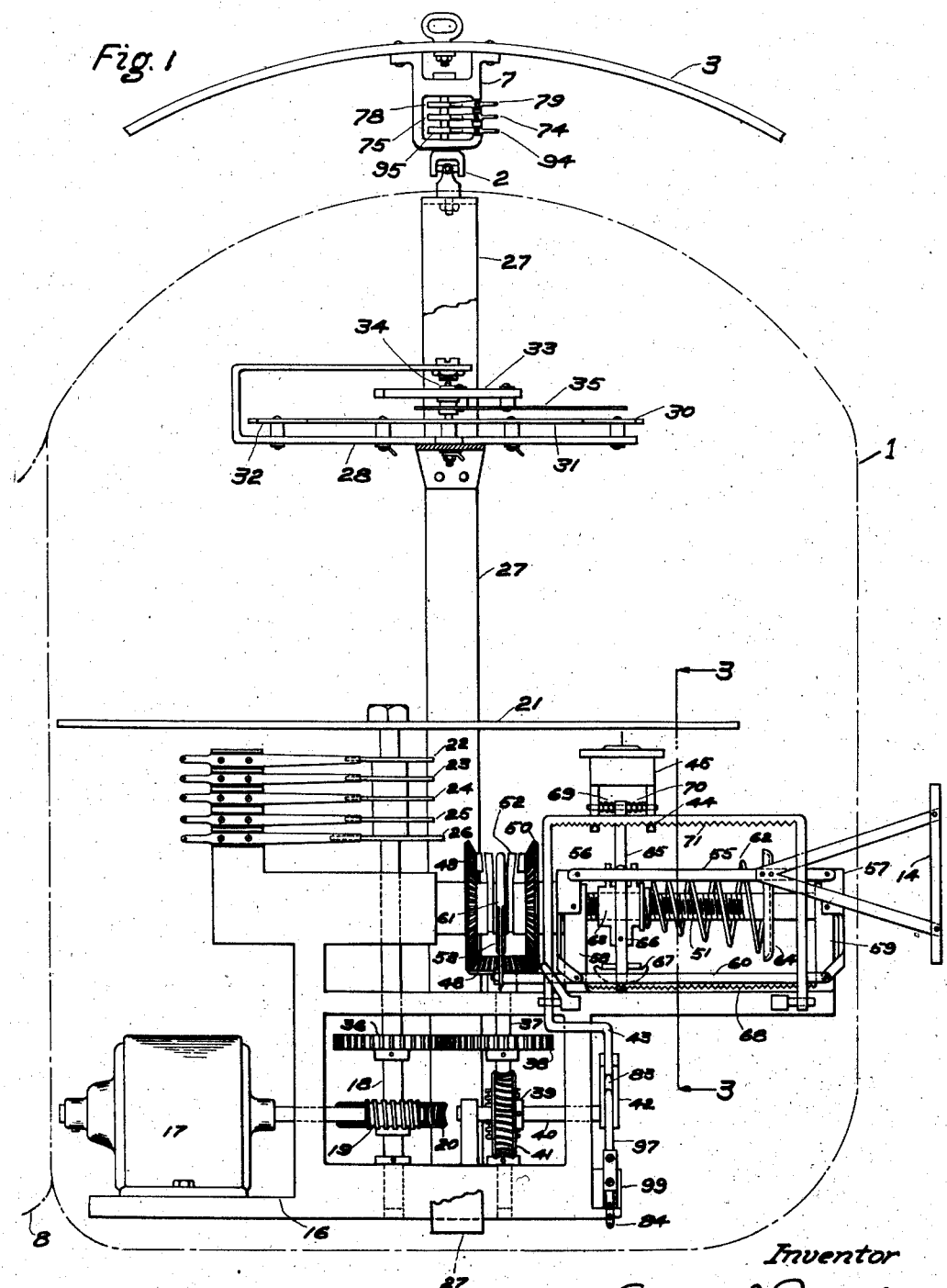

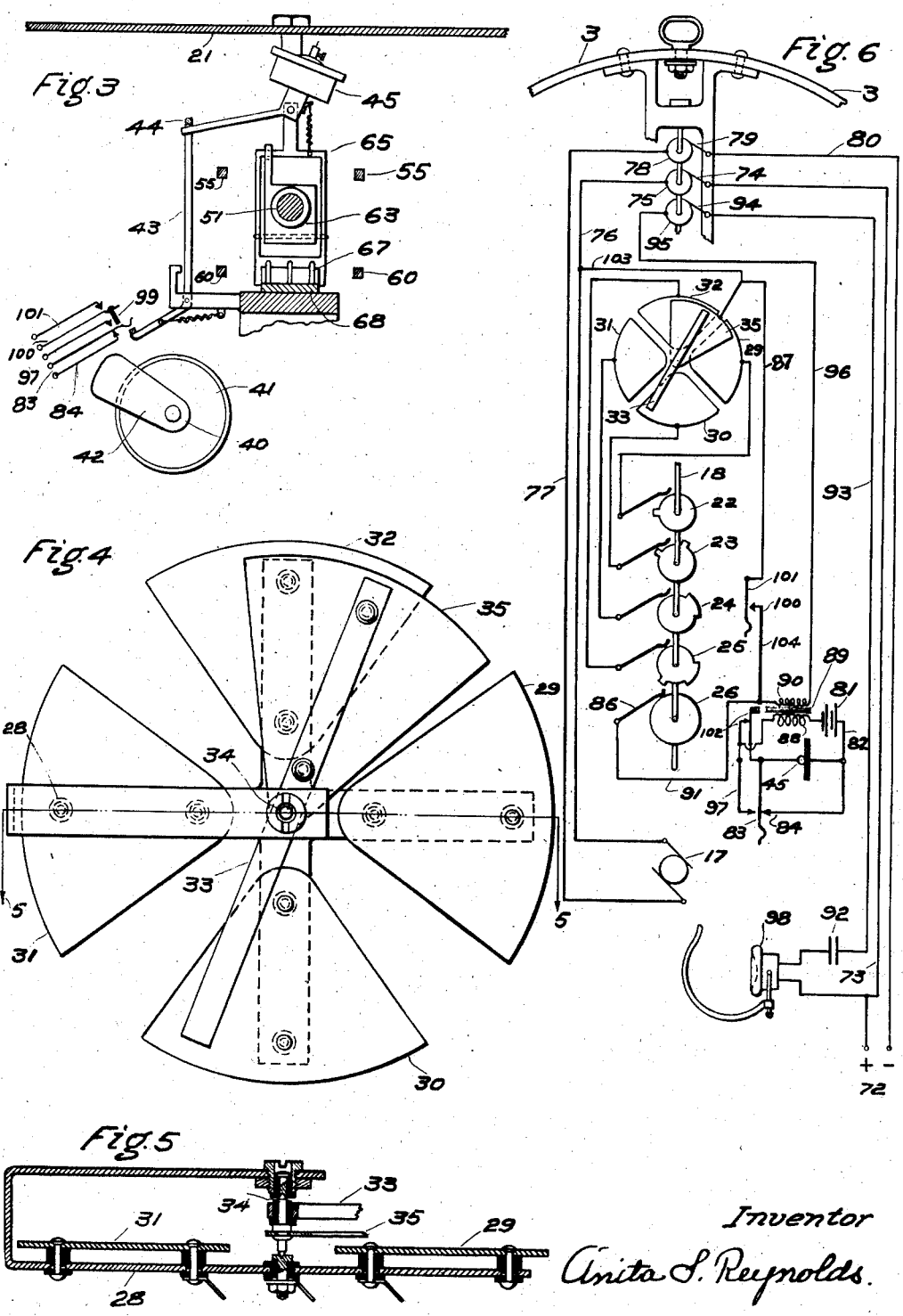

Patented June 13, 1933

1,913,512

UNITED STATES PATENT OFFICE

ANITA S. REYNOLDS, OF PRINCETON, NEW JERSEY

METEOROLOGICAL INDICATOR

Original application filed October 10, 1925, Serial No. 61,802. Divided and this application filed May 3, 1930. Serial No. 449,576.

This is a division of application Serial No. 61,802, filed October 10, 1925.

The invention relates to devices for determining the direction of the wind, and more particularly to a device by means of which atmospheric conditions at considerable distances above the earth's surface may be quickly and accurately determined.

One of the objects of the invention is to provide means whereby the direction of the wind in the upper strata of the atmosphere may be determined, and the information transmitted telephonically to a station on the earth's surface or elsewhere.

Another object is to provide means whereby an aviator, flying in the vicinity of a station may receive information, as by wireless.

Another object is to provide means whereby information may be obtained automatically under all weather conditions.

Another object is to provide means whereby one or more of the devices may be attached to a body, such for example as a captive balloon, above the earth so that information as to meteorological conditions may be obtained quickly from various altitudes, as may be desired.

Another object is to provide means for illuminating the device for use at night and under fog conditions.

Another object is to provide means whereby, in obtaining the direction indication, there is no mechanical connection with the compass needle, thereby permitting the latter to have the utmost freedom in assuming a true magnetic north and south position.

One embodiment of the invention is illustrated in the accompanying drawings, in which like parts are designated by similar characters of reference, and in which:

Fig. 1 is a side elevation of the device with its protecting cover removed.

Fig. 2 is an elevation of the device supported by means of a captive balloon.

Fig. 3 is a section on the line 3—3 of Fig. 1.

Fig. 4 is a plan view of the compass needle and the four direction segments corresponding to the four directions, north, south, east, and west.

Fig. 5 is a section of Fig. 4 on the line 5—5.

Fig. 6 is a plan of the circuit for operating the device.

Fig. 7 is a diagram showing the operation of the device by wireless.

In the embodiment of the invention illustrated, the device is enclosed in a protective casing 1 and is suspended by means of a universal joint 2, from the upper part of a ring 3. This ring is attached by means of a cable 4, to a captive balloon 5. At the lower part of the ring 3, a cable 6 maintains a connection with the ground.

In this position the device is free to revolve turning on bearings in mounting bracket 7 as the wind shifts its direction. A direction vane 8, serves to maintain the device in such a position that a wind velocity measuring element 14, will always be held in position to receive the force of the wind.

The device as illustrated, is intended to be attached to a captive balloon, a kite or any other means of aerial suspension. It is of course understood that if desired the device may be mounted on some rigid support on the earth's surface in a manner similar to that of an ordinary weather vane.

Mounted on a framework 16 within the casing 1 is an electric motor 17 which drives a shaft 18, by means of a worm 19 and wormwheel 20. The upper part of the shaft 18 carries a phonograph record 21, four code cams 22, 23, 24, 25, and a collector ring 26. The frame 16 is carried by a supporting frame 27 which latter is attached at its top to the universal joint 2.

In the upper part of the frame 27 there is mounted a support 28 which carries segments 29, 30, 31, 32 representing the four points of the compass. A compass needle 33 is freely pivoted on points 34 at the center of the frame, and carries on its north seeking end a segment 35, the object of which is to transmit electrostatically by induction, code impulses from the cams 22, 23, 24 and 25, these cams being wired electrically to the segments 29, 30, 31 and 32 as illustrated in Fig. 6, the compass needle 33, and the segment 35 carried by it therefore serve as a datum for determining wind direction.

A spur gear 36 on the shaft 18 drives a shaft 37 through a spur gear 38, and a worm 39 on the shaft 37 drives a shaft 40 by means of a wormwheel 41. Attached to the end of shaft 40 is a cam 42 which engages with a lever 43, causing the upper part 44 of lever 43 to raise a microphone 45 into engagement with the phonograph disc 21 carried on the upper end of the shaft 18, also operating contact springs 97.

The position of the microphone or pickup device 45 with reference to the phonograph record is determined by the velocity of the wind in the following manner.

The upper part of the shaft 37 carries a bevel pinion 48 which drives the two bevel gears 49, and 50, one clockwise and the other counter clockwise. The gears 49 and 50 are loosely mounted on a shaft a portion of which is screw-threaded as at 51. A clutch member 52, which is pivotally attached to shaft 51 at the point 53, will rotate said shaft either clockwise or counter clockwise depending upon whether it engages with gear 50 or with gear 49. The wind pressure vane 14, is mounted on a frame 55 which is mounted pivotally on two members 56 and 57. These two members are pivotally supported on posts 58, and 59 forming part of the frame 16. The lower ends of the members are pivoted to a frame 60, which latter supports a clutch ring 61.

With the motor operating and the wind pressure vane 14 held broadside to the wind, it will be thrust back by the pressure of the wind, moving the frame 55, backwards and through the members 56, and 57 moving the frame 60, forward, thus engaging the clutch 52 with the gear 50. This will revolve shaft 51 in the clockwise direction causing the nut 63 to move forward compressing a spring 62, against a support 64 attached to the frame 55. When the tension of the spring 62 reaches equality with the pressure of the wind against the vane 14, the latter will be moved forward slightly disengaging the clutch 52 from the gear 50 and causing the rotation of shaft 51 to cease.

When the wind pressure decreases, the spring 62 will force the vane 14, forward and allow the clutch member 52 to move back and engage with the gear 49, thus revolving the shaft 51 in the counter clockwise direction and moving nut 63, carried on the screw back until the decreased pressure of the spring again equals the pressure on vane 14 when the clutch will be moved into neutral position.

The spring 62, is calibrated in miles per hour wind speed and it will thus be seen that the position of the nut 63 will vary accordingly as the wind pressure varies.

The phonograph record, which may be of the sinuous, or "hill-and-dale" type has recorded in its grooves a vocal record giving the miles per hour that will obtain when the nut 63 with the microphone 45 is in the corresponding positions. This record is made to correspond with the calibration of the instrument.

As in all devices of this character there will be slight frictional losses causing the device to read slightly lower or slightly higher than the correct reading. In order to correct for this error I have included in this device a hysteresis lag compensator.

This feature operates in the following manner. An arm 65, is pivotally mounted on the nut 63 at the point 66. The lower end of said arm carries a series of flexible springs 67, which engage with a roughened surface 68. Therefore with an increasing wind, as the nut advances towards the vane 14, the lower end of arm 65 is retarded, causing the upper end to move forward further than the nut 63 moves, or in other words an amount just sufficient to compensate for the frictional lag of the device. On a decreasing wind speed the arm 65 is moved in a like manner backwards towards gears 49 and 50, a slightly greater distance than the nut 63, again compensating for the frictional loss. The microphone 45 is slidably mounted on arm 65 and is held in place by two springs 69 and 70 whereby the nut 63 may move a short distance while 45 is in engagement with 21 held by the notches 71 on the under side of 44.

In determining the direction of the wind it will be seen that the compass needle 34, will point due north at all times. The device however under control of the directional vane 8, will swing with the wind thereby bringing a corresponding one of the segments 29, 30, 31, 32 directly underneath the segment 35, attacked to the compass needle. This will permit the signals derived from the cam which is electrically connected to that particular segment, to pass through the circuit by induction and be heard by the observer through a telephone receiver 98.

The operation of the circuit is as follows: Current flows from a source 72 through wire 73, brush 74, collector ring 75, wire 76, motor 17, wire 77, collector ring 78, brush 79 and wire 80 to the source 72.

This causes motor 17 to set the device in operation and during each cycle there will be two separate functions performed.

First: When the circuit combination is as shown in Figure 6 with cam 42 in the position shown in Figure 3 and the set of contact springs 99 also in the position shown in Figure 3, information as to the direction of the wind will be given.

Second: When cam 42 shown in Figure 3 advances to the position engaging the lower end of 43, raising microphone 45 and operating contact springs 99, information will be given as to speed of the wind.

The purpose of closing contact springs 83 and 84 is to short-circuit the transmitter button when wind direction is being given; the purpose of closing contact springs 83 and 97 is to short-circuit the vibrator of the induction coil 89, and of closing contacts 100 and 101 is to short-circuit the direction code cams when the speed of the wind is being given.

Considering in detail the circuit noted under the first combination above, current flows from the battery 81, wire 82, contact spring 84, contact spring 83, vibrator 102, primary coil 88 to battery 81; thus causing the vibrator 102 to operate. This sets up induced currents in the secondary 90 which pass through wire 91, brush 86, collector ring 26, to the code cams 22, 23, 24, 25, and from these when they contact with their respective brushes to the four corresponding compass segments 29, 30, 31 and 32. Segment 35 attached to the compass needle 33 will be standing over one of these compass segments and will be charged and discharged by induction due to current generated in secondary coil 90 through the particular code cam connected with that segment. The circuit continues through wire 103, wire 76, collector ring 75, brush 74, wire 73, telephone receiver 98, condenser 92, wire 93, brush 94, collector ring 95, wire 96 and back to coil 90. An observer listening at the telephone receiver 98 will therefore receive the particular dot and dash code in accordance with the compass segment which is in contact by induction with the compass needle. This code will therefore indicate the direction of the wind at that moment.

Considering the second circuit combination, cam 42, will at that time have operated the contact springs 99 causing springs 84 and 83 to open, removing the short-circuit from the transmitter button and closing contact springs 83 and 97, placing a short circuit around the vibrator 102. Also springs 100 and 101 will be closed placing a short circuit across the path through the dot and dash cams 22 to 25 inclusive. Under these conditions the circuit operation is as follows: Current will flow from battery 81, wire 82, microphone 45, contact spring 83, contact spring 97, primary 88 and back to battery 81.

Engagement of the transmitter button 45 with the phonograph disc will operate the button, and the induced currents set up in the secondary coil 90 will be picked up by the observer through receiver 98 as follows: Secondary 90, wire 104, contact spring 100, contact spring 101, wire 87, wire 103, wire 76, collector ring 75, brush 74, wire 73, receiver 98, condenser 92, wire 93, brush 94, collector ring 95, wire 96 and back to the secondary 90. Through this circuit a voice indicating the speed of the wind will be picked up from the phonograph disc 21.

The cams 22, 23, 24 and 25 can be cut to make any suitable code signal, but as shown they make one short pulse, two short pulses, one long pulse, and a long and short pulse respectively; representing the four points of the compass. Intermediate points will be represented by a combination of two of the above.

In the embodiment of the invention illustrated the compass is illustrated with the cardinal points only, but it is to be understood that compasses having all of the points may be employed; also any known method of producing a tone may be used in place of 26.

Obviously the device illustrated in detail in Figs. 4 and 5 need not be a compass but the member 33, carrying the condenser element 35, may be positively driven, and signals other than the points of the compass may be transmitted.

The hysteresis compensator, and the velocity measuring mechanism are not claimed herein, but are the subject matter of my co-pending application for patent Serial No. 605,128, filed December 5, 1922, and the co-pending application Serial No. 492,394 for patent of John N. Reynolds and myself filed August 15, 1921, respectively.

In accordance with the provisions of the patent statutes the principle of the invention has been described, together with the apparatus which is now considered to represent the best embodiment thereof, but it is desired to have it understood that the apparatus shown is merely illustrative, and that the invention may be carried out in other ways.

The invention having been described, what is claimed and desired to be secured by Letters Patent is:

1. A meteorological indicator adapted to be carried by a balloon, comprising a first element coupled to a compass for movement thereby, a second element adapted to be turned to a position corresponding to the direction of the wind, and means for transmitting to a remote point a signal representing the angular position of said second element relative to said first element.

2. A meteorological device comprising a wind direction indicating element, a compass needle, and means for indicating the angular position of said element with respect to said needle.

3. A meteorological indicator comprising a first wind direction indicating element, a compass, a second element coupled to said compass for movement thereby to a plurality of positions, and means for indicating the angular position of said first element with respect to said second element.

4. A meteorological indicator comprising a freely rotatable frame, a first rotatable element and compass means for rotating said element, both carried by said frame, and a directional vane attached to said frame for fixing its angular position with respect to the wind.

5. A meterlogical device comprising a wind direction indicating element, a compass needle, and electrostatic means for indicating at a remote point the angular position of said element with respect to said needle.

6. A meteorological device comprising a wind direction indicating element, a compass needle, a plurality of code producing devices each corresponding to a different point of the compass, and electrostatic means under control of said needle, for rendering active the one of said code producing devices which corresponds to the direction of the wind at that time.

7. A meteorological device comprising a freely rotatable frame, a compass needle carried thereby, a plurality of condenser plates fixed to said frame around said needle, each corresponding to a different wind direction, means for turning said frame in a given direction with respect to said wind, a condenser plate carried by said needle, and a signal circuit connected with said plates first mentioned and with said plate carried by said needle.

8. An indicating system for a device adapted to change its angular position in a horizontal direction, comprising a compass needle carried by said device, means for determining the angular position of said device relative to said needle, and means for transmitting to a remote point signals representing said angular position.

9. A meteorological device comprising a wind direction indicating element carried by a floating member, a compass needle, and means for indicating the angular position of said element with respect to said needle.

10. A meteorological indicator comprising a wind direction indicating element carried by a floating member, a compass, a second element coupled to said compass for movement thereby to a plurality of positions, and means for indicating the angular position of said first element with respect to said second element.

11. A meteorological device comprising a wind direction indicating element carried by a freely movable support, a compass needle, and electrostatic means for indicating at a remote point the angular position of said element with respect to said needle.

12. A meteorological device comprising a wind direction indicating element carried by a freely movable support, a compass needle, a plurality of code producing devices each corresponding to a different point of the compass, and electrostatic means under control of said needle, for rendering active the one of said code producing devices which corresponds to the direction of the wind at that time.

13. A meteorological device comprising a wind direction indicating element, a magnetic meridian indicating member, and means for indicating the angular position of said element with respect to said member.

14. A meteorological device comprising a wind direction indicating element, a magnetic meridian indicating member, means for indicating the angular position of said element with respect to said member and means for transmitting said indication to a remote point.

In testimony whereof I hereto affix my signature.

ANITA S. REYNOLDS.